United States Patent Office 3,842,002
Patented Oct. 15, 1974

---

3,842,002
METHOD FOR REMOVING SULFATE AND BICARBONATE IONS FROM SEA WATER OR BRACKISH WATER THROUGH THE USE OF WEAK ANIONIC EXCHANGE RESINS CONTAINING AMINO GROUPS OF THE PRIMARY AND SECONDARY TYPE
Gianfranco Boari, Rome, Italy, assignor to Consiglio Nazionale Delle Ricerche, Rome, Italy
Continuation-in-part of abandoned application Ser. No. 54,255, July 13, 1970. This application Mar. 29, 1973, Ser. No. 346,111
Claims priority, application Italy, July 14, 1969, 38,657/69; July 3, 1970, 51,892/70
Int. Cl. B01d 15/04
U.S. Cl. 210—32                       5 Claims

ABSTRACT OF THE DISCLOSURE

There is provided a method for removing sulfate and bicarbonate ions from sea water or brackish water prior to being subjected to desalination in a conventional desalination plant, which comprises:
permitting said sea water or brackish water to pass through a bed containing the chloride form of a weak anionic resin having amino functional groups of the primary and secondary type, said chloride form of said resin being expressed as R—Cl, thus permitting the sulfate ions in said sea water or brackish water to be exchanged for the chloride ions of said resin by the following equation:

$$R-Cl + SO_4^{=} \rightarrow R-SO_4 + Cl^{-} \qquad (1)$$

said bicarbonate ions in said sea water or brackish water being eliminated by the hydrolysis of said resin according to the following equations:

$$R-Cl + H_2O \rightleftharpoons R-OH + \underline{H}^{+} + Cl^{-} \qquad (2)$$

$$HCO_3^{-} + \underline{H}^{+} \rightarrow CO_2 + H_2O \qquad (3)$$

and subsequently, regenerating said resin to the chloride form, when said resin is exhausted, by permitting the brine solution discharged from the desalination procedure and having a salt concentration of at least 5 times greater than that of said sea water or brackish water to circulate through said bed containing said resin having said amino functional groups of the primary and secondary type,
the chloride/sulfate ratio of said brine solution being at least 3 times greater than that of said sea water or brackish water treated, and
the pH of said brine solution being sufficiently small enough to displace reaction (2) above, to the left.

CROSS-REFERENCE TO RELATED APPLICATIONS

This application is a continuation-in-part application of my earlier co-pending application Ser. No. 54,255 filed on July 13, 1970, now abandoned and claims priority from July 14, 1969, based on Italian Patent Application No. 38,657A/69.

SUMMARY OF THE INVENTION

The present invention relates to a method for removing sulfate and bicarbonate ions found in sea water or brackish water, prior to being subjected to desalination. These sulfate and bicarbonate ions, when permitted to come in contact with desalination equipment, tend to foul such equipment and eventually impair its performance.

More specifically, the present invention proposes to remove such sulfate and bicarbonate ions from sea water or brackish water, prior to being subjected to desalination, through the use of any weak anionic resin containing amino functional groups of the primary and secondary type and which have been converted to the chloride form, the chloride form of said above-described resin being used alone or in combination with cationic resins.

DETAILED DESCRIPTION OF THE INVENTION

While any weak anionic resin exhibiting amino functional groups of the primary and secondary type can be employed in the present invention, a preferred type of weak anionic resin containing amino functional groups of the primary and secondary type is that of the DVB-acrylic type resin.

Similarly, with respect to converting the above-described resins to the chloride form, any means available to the skilled artisan can be employed. For instance, such chloride forms of said resins are available on the commerical market per se; however, if one does not wish to purchase an already chlorinated resin of the type used herein, one can convert the weak anionic resins of the present invention to their chloride form by contacting the same with sodium chloride, or even by contacting the resin with the brine solution maintained in the desalination plant. However, in any event, it is to be understood that the manner in which the weak anionic resin of the present invention are converted to their chloride form is of no critical significant, as long as the chloride form is attained.

With the foregoing in mind, the following discussion will more adequately serve to explain the contribution offered by applicant in light of the prior art.

As is well known, the less soluble salts present in sea water or brackish water, or which can be formed as a consequence of a temperature increase thereof, are those of calcium carbonate, magnesium hydrate, and calcium sulfate.

In desalination plants, desalinated water is produced while at the same time there is discharged a solution having a higher concentration than that of the initial feed water. The ratio between the salinity of the discharged concentrated solution or "brine" and that of the feed water is called "the concentration ratio."

When operating under concentration ratios below 2 and at a temperature not exceeding 110° C., the only scale formations which occur in the desalinating plant equipment are due to the thermal decomposition of bicarbonate ions and to the subsequent formation of calcium carbonate and magnesium hydroxide.

In order to prevent such scale formation, which obviously impairs the function of desalination equipment, the addition of chemical compounds to isolate or inhibit such scale formers have been used, and are efficient up to a temperature of about 80° C.

In yet another method, sea water or brackish water can be acidified until the total neutralization of the bicarbonate ions has been achieved, the carbon dioxide evolved, being subsequently removed. However, this particular mode of removing bicarbonate ions is rather expensive, since it must be performed on the total feed water of the desalination plant, i.e., on the desalinated water as well as on the brine.

When using sulfuric acid, which happens to be one of the cheapest acids available, an increase in the concentration of the sulfate ion is noticed and accordingly, there is an increase in the possibility of obtaining calcium sulfate precipitation at the highest temperatures. When this acid is used, the cost of treatment will vary as a function of the cost of the acid as well as of the bicarbonate percentage, which is present in the sea water or brackish water.

The bicarbonate removal enables the raising of the maximum operating temperature of the thermal desalination plant up to about 110° C Above said temperature of 110° C., as can be seen from the diagram of FIG. 1 of the accompanying drawings, the solubility limits of the anhydride are diminished. In some plants, operating according to a controlled manner, the operating temperature can be raised to 120° C., with concentration ratios equalling 2, taking advantage of the fact that the rate of anhydride formation is very low and that the crystal nuclei resolute as the temperature decreases.

At each temperature "$t$," where:

$X_{Ca}$=calcium ion concentration in the sea water per mole/l.;
$X_{SO4}$=sulfate ion concentration in the sea water taking into account the increase due to the addition of the sulfuric acid necessary for the destruction of the bicarbonate ion, in mole/l.;
$r$=concentration ratio of the sea water necessary to reach the solubility limit of the various forms of calcium sulfate.

The following equation takes place:

$$[r.X_{Ca}][r.X_{SO4}] = Kps \qquad (1)$$

where $Kps$ represents the solubility product at the temperature "$t$" of the form of the calcium sulfate considered. Disregarding the solubility increase due to the salinity and therefore, due to the ionic force increase, a decrease in the concentration of the calcium and sulfate ions in the feed water, due to treatment adapted to reduce the concentration until the values $X_{Ca}$ and $X_{SO4}$ enables the temperature to raise the concentration up to a value $r_X$ such that the aforementioned solubility product "$Kps$" remains unchanged, i.e.:

$$[r_X \cdot X_{Ca}^*][r_X \cdot X_{SO_4}^*] = Kps \qquad (2)$$

Equalizing Equations (1) and (2), the following equation will be obtained:

$$r_X = r \sqrt{\frac{X_{Ca} X_{SO_4}^*}{X_{Ca}^* X_{SO}}} \qquad (3)$$

As is well known, studies have been made for many years concerning the reduction of the concentration of the calcium ions in sea water or brackish water through the use of Na-anionic exchange resins of the strong cationic type, these being regenerated with the dicharge brine from the desalination plant.

The results of such a treatment have, to date, been limited by the extremely high magnesium/calcium ratio (about 4.5) and the sodium/calcium ratio (about 20.0), which has the effect of diminishing the exchange capability of the resin on ions, other than calcium ions, thus eliminating only a small percentage of calcium.

In the diagram of FIG. 2, there is shown the results of laboratory studies when treatment using such cationic resins is performed. According to that treatment, and in consequence of the Equation (3), reproduced above, the concentration ratio "$r_X$" will be, $r_X=1.44$ as a function of the ratio of the treated water volume to the resin volume.

On the other hand, the sulfate removal can be performed in the case of water exhibiting low salinity by means of treatment with a strong anionic resin bed, preliminarily converted to the chloride form; however, it has been found uneffective for sea water or brackish water because of the high concentration of the chloride ions to the sulfate ions present.

Accordingly, applicant has overcome the disadvantages associated with prior art procedures for removing sulfate and bicarbonate ions from sea water and brackish water, by discovering that such disadvantages of the prior art can be overcome by employing any weak anionic resin having functional amino groups of the primary and secondary type, as discussed below.

According to the method of this invention, sea water or brackish water is permitted to percolate, prior to desalination, through a bed containing any weak anionic resin having amino functional groups of the primary and secondary type (though those of the DVB-acrylic type are preferred), which resin has been previously converted to the chloride form by any conventional means. As stated earlier, the means to obtain the chloride form of applicant's resins is of no importance, provided the chloride form is obtained. Therefore, illustrative of one method of converting applicant's resins to their chloride form is simply by contacting said resins with the "brine" derived from a desalination plant.

In accordance with applicant's method, it has been conclusively established that applicant's resins, due to their different selectivity with respect to the chloride and sulfate ions, if compared with that of strong anionic resins, enable the equilibrium of the following reaction to be displaced towards the right and at a rate higher than the chloride concentration in the resin:

$$2R—Cl + SO_4^= \rightleftharpoons R_2SO_4 + 2Cl^- \qquad (4)$$

The selectivity coefficient must, however, be such as to permit the sulfate form of the resin to be eventually regenerated by means of more concentrated chloride solution, when the resin eventually becomes exhausted of its exchange ability.

Summarizing thus far, in accordance with applicant's invention, the chloride form of his resin contacts the sulfate ions present in sea water or brackish water and subsequently, exchanges the chloride ion maintained on the resin molecule for the sulfate ions in the sea water or brackish water, the sulfate ions now being part and parcel of the resin, while the chloride ion remains free in the treated water.

It is also well known that a weak anionic resin is capable of exchanging hydroxyl groups with strong anions, but only in an acid medium and in such an amount that the greater the acid concentration, the greater is the difference:

$$PK_{resin} - PH_{feed\ water}$$

as may be seen from the analysis of the exchange and hydrolysis reactions reproduced below:

$$R—OH + Cl^- \rightleftharpoons R—Cl + OH^- \qquad (5)$$
$$R—Cl + H_2O \rightleftharpoons R—OH + H^+ + Cl^- \qquad (6)$$

The hydrolysis is promoted by the presence of the bicarbonate ions in the water, which neutralize the acidity made free, according to the following reaction:

$$HCO_3^- + H^+ \rightleftharpoons H_2O + CO_2 \qquad (7)$$

enabling (the amount of water passing through the resin being equal) one to obtain a higher hydrolysis effect by percolating sea water or brackish water through a weak anionic resin, which has been previously converted to the R—Cl form, the hydrolysis reaction (6) can be used in order to remove the bicarbonate ions from the water treated according to Equation (7), which takes place concurrently with the desulfating reaction (4).

The results of tests conducted, as illustrated in the diagram of FIG. 3 of this application, substantiate what has been stated above.

In fact, the higher the exhaustion degree of resin in the chloride form, the higher will be the desulfating effect in accordance with Equation (4) and the higher will be the resin hydrolysis according to Equation (7). Consequently, the pH of the treated water becomes lower.

Once the resin has exhausted its exchange capability, it must be regenerated back to the chloride form in order that the exchange process can be continually carried out and to this end, it is necessary to displace Equation (4) to the left and at the same time, Equation (6) to the left, since during the operating cycle, a partial hydrolysis of the resin occurs.

The above displacement is achieved by permitting a solution having a salt concentration of at least 1.5, but preferably two to three times greater than that of the treated water to circulate through the resin bed, said solution being, for instance, the "brine" solution of the desalination plant where the sea water or brackish water has been treated and where there remains, in the brine solution, a chloride/sulfate ratio of at least three times, but preferably five times, greater than said sea water or brackish water treated.

It is further necessary to perform the regeneration while maintaining th solution at a pH low enough to displace reaction (6) to the left. This can be achieved, for instance, by adding a sufficient amount of carbon dioxide or sulfur dioxide. If regeneration is not performed under these conditions, a progressive transformation of the resin will result from the R—Cl form to the R—OH form and Equation (4) would be displaced to the left and a gradual decrease would occur on the part of the resin in the chloride form so that no appreciable exchange capability would be observed. That is, Equations (4) and (7) above, would be impaired.

In addition, besides the resin exhaustion degree and the activity ratio between the hydroxyl ions and the chloride ions being equal, the higher will be the chloride ion concentration as in the brine of the desalination plant and the higher will be the hydroxyl concentration at the equilibrium point, and consequently, a pH in accordance with Equation (6) is reached.

As hereinbefore considered, if a regenerating solution, enriched in sodium chloride is permitted to be saturated with carbon dioxide and maintained at a pH of about 4 to 5, the entire resin which has been preliminarily hydrolyized, can be converted to the chloride form, thus obtaining treated sea water or brackish water exhibiting a pH of about 3.5. The carbon dioxide may be recycled continuously and can be recovered by vacuum degassing, either from the regenerating solution effluent forming the resin bed, or from the feed water of the desalination plant, due to the fact that the operation is necessary in either event.

An incidental acidity demand in the entire cycle balance can be suitably compensated for by adding sulfuric acid upstream of the degassifier in order to decompose the bicarbonate ions and promote carbon dioxide recovery.

The carbon dioxide, together with the sulfur dioxide, can also be recovered from the flue gas of the heating plant, associated with the desalination plant, or from the exhaust gas of a Diesel unit, or the like, Operating in this manner, it will be possible to eliminate or minimize the use of sulfuric acid, which is necessary to perform the decomposition of the bicarbonate ions and accordingly, to reduce the expense involved.

The present invention will be more adequately described and understood by the following example, which serves as a mere illustration of the present invention and is in no way to be considered limitative thereof.

THE EXAMPLE

In the diagram of FIG. 3, there are described the curves of the concentration ratios between the sulfate ions present in sea water and those present in the treated water as a function of the volumes of the water produced, of the resin exhaust degree, and therefore, of the pH of the effluent water and of the flow rate.

The resins which have been employed in the test conducted, are those of the epossiamino type. They contain I, II, III and quaternary groups and have an exchange capacity which varies of from 1.8 to 2.0 g./l. of resin. An example of a resin of this type is the resin produced under the name "ES 57," produced by The Diamond Alkali Company and the "A 100" resin produced by The Montecatini Edison Company. A treatment using said resin can theoretically produce an increase in the concentration ratio in the desalination plant to values of $r_x \leqslant 4.5r$.

The foregoing operative conditions permit the pH of the treated water to become less than 2.0, so that there are two requirements which have to be satisfied:

(1) Neutralization of the treated water by means of a base or by permitting said water to percolate through a cationic resin bed, which has been previously regenerated with brine effluent from the desalination plant, and (2) The use of strong acids in order to maintain such pH values of the regenerating solution, which enable the resin which is regenerated in the hydroxyl form by hydrolysis to be transformed into the chloride form.

In the test conducted, the operating conditions were maintained in such a manner that the pH of the effluent solution from the anionic resin bed ranged between 3 and 4, in order to permit conversion of the R—OH groups to the R—Cl form to take place in the exclusive presence of weak acids, e.g. $H_2CO_3$.

Under such conditions, the sea water is completely dealkalized and successively neutralized by means of the addition of a small amount of calcium hydroxide (about 0.5 equivalence per m.$^3$ of the treated water).

By using an exhaustion flow rate of 15 volumes of water per volume of weak anionic resin per hour, so as to produce 5 volumes of water per each resin volume and per cycle, a reduction in the concentration of the sulfate ion was attained in the treated water, which was 4.7 times lower than that of the feed water.

In this manner, it is possible to reach sea water concentration ratios of:

$$r_{x_2} \leqslant 2.25r$$

Since the regeneration time provided approximated 10′, the washing phase of the resin was unnecessary and the required amount of resin was about $\frac{1}{10}$ of the volume per "h." of water to be treated. Where continuous processes are employed, the cycle period can be further reduced and accordingly, the required amount of resin as well.

Further tests performed, using a weak anionic resin of the DVB-acrylic type, which is porous and contains I and II amino groups and has an exchange capacity of 2.7 g./l. of resin (as for instance, the "A–102" resin produced by The Montecatini Edison Company) in combination with the use of stage regenerating techniques exhibited a considerable increase in the treated water per cycle (15 volumes per 1 volume of resin) as well as that of the desulfating degree.

This enabled the sulfate ion concentration of the feed water to be reduced from 3,000 p.p.m. to 15–30 p.p.m.

The concentration ratio $r_x$ in this case, can be raised to a value of:

$$r_x \leqslant \text{from 10 to } 14r$$

Under these conditions, the increase in the concentration and operating temperature in the desalination plant of the evaporation type is no longer adversely affected by scaling problems. It is also possible to associate the treatment carried out by using weak anionic resins with that performed by using a strong cationic resin. That is to say, the weak anionic resins of the present invention can be used, effectively, in combination with strong cationic resins.

The sodium chloride contained in the brine of the desalination plant can be used for regenerating the strong cationic resin in order to transform the same from the calcic and magnesic form to the sodic form at the expense of the sodium ion and the weak anionic resin from the sulfate form to the chloride form at the expense of the chloride ion. The required amount of cationic resin employed can be half of that of the anionic resin employed, since the cationic exchange treatment, as will be seen from a review of the diagram of FIG. 2, is less influenced by the exhaustion flow rate and is only varied slightly as the volume of the treated water to the resin volume increases.

With an exhaustion flow rate of 15 feed water volumes per volume of weak anionic resin, of the aforementioned type, and a flow rate of 30 water volumes per volume of a cationic resin and when the production per cycle is limited to a 5 water volume per volume of anionic resin and of 10 water volumes per volume of a cationic resin, it is possible to attain concentration ratios of $r_x \leqslant 3.1r$.

In the diagram of FIG. 4, there is shown the ratios $r_x/r$ between the concentration ratios which can be obtained with the different aforementioned treatments in function of the equilibrium pH of the weak anionic resins of the epossiamino type; of the exhaust flow rate; and of the treated water volume per resin volume; and the concentration ratios, which can be attained using sea water as such.

DESCRIPTION OF THE DRAWINGS

In the accompanying drawings, there are shown the following diagrams.

Curve 1 relates to the sea water as such;
Curve 2 relates to feed water which has been subjected to a cation exchange treatment and where:
 the exhaustion flow rate is $30V_a/V_r$ per h.;
 the production is $5V_a/V_r$ per cycle;
Curve 3 relates to feed water which has been subjected to an anion exchange treatment using weak anion resins and where:
 the exhaustion flow rate is $15V_a/V_r$ per h.;
 the production is $5V_a/V_r$ per cycle;
Curve 4 relates to feed water which has been subjected to a mixed ion exchange treatment, i.e.:
 A cation exchange treatment, where:
  the exhaustion flow rate is $30\ V_a/V_r$ per h.;
  the production is $10V_a/V_r$ per cycle.
 An ion exchange treatment, where:
  the exhaustion flow rate is $15V_a/V_r$ per h.;
  the production is $5V_a/V_r$ per cycle;
 $r$ is the concentration ratio;
 $V_a$ = the volume of the treated water
 $V_r$ = the volume of the resin.

Figure 1:
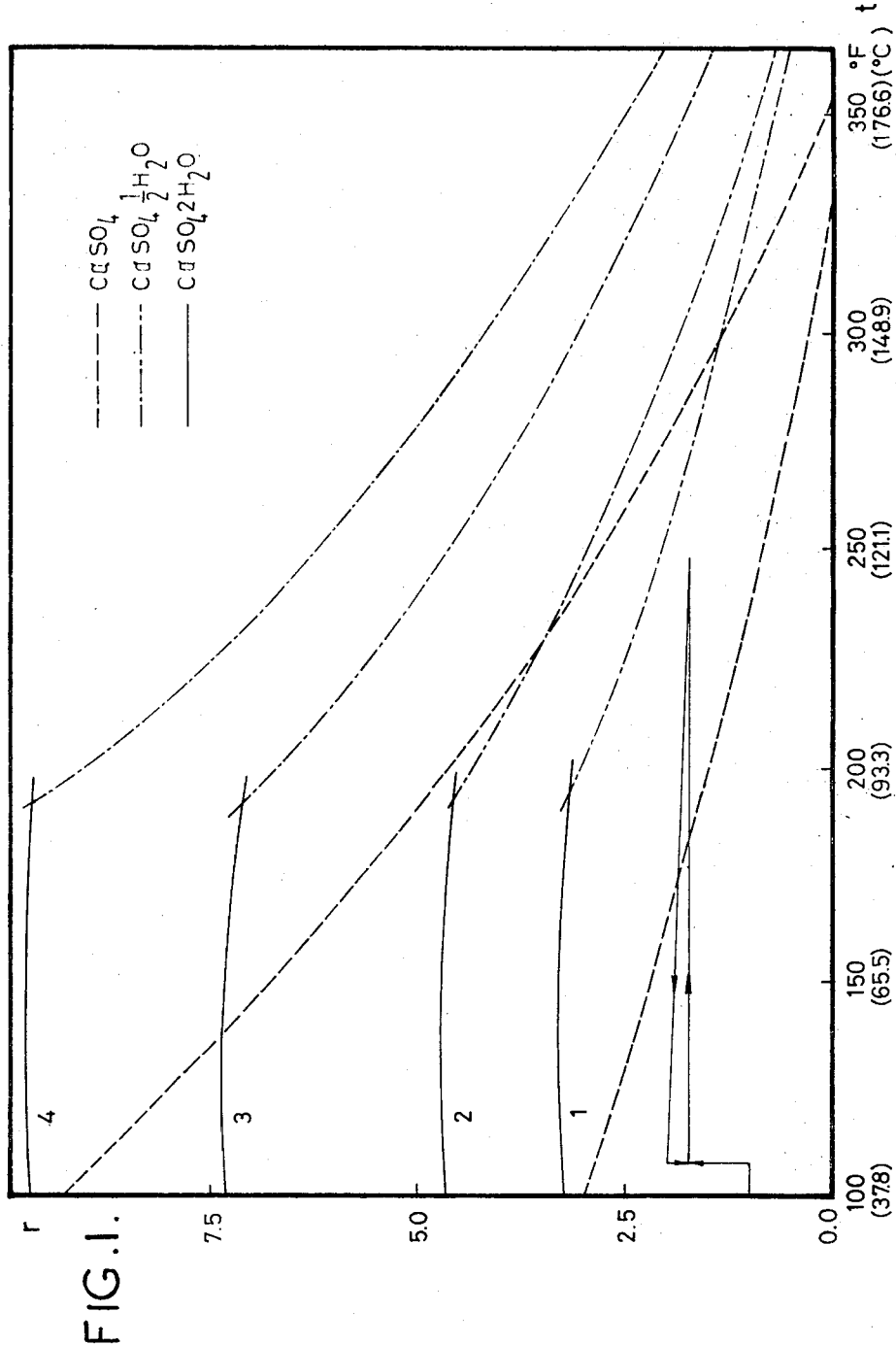
FIG. 1 illustrates the limiting concentration ratios in function of the temperature "$t$" with regard to the different allotropic forms of calcium sulfate, when the type of treatment of the sea water is varied and more particularly.
Figure 2:
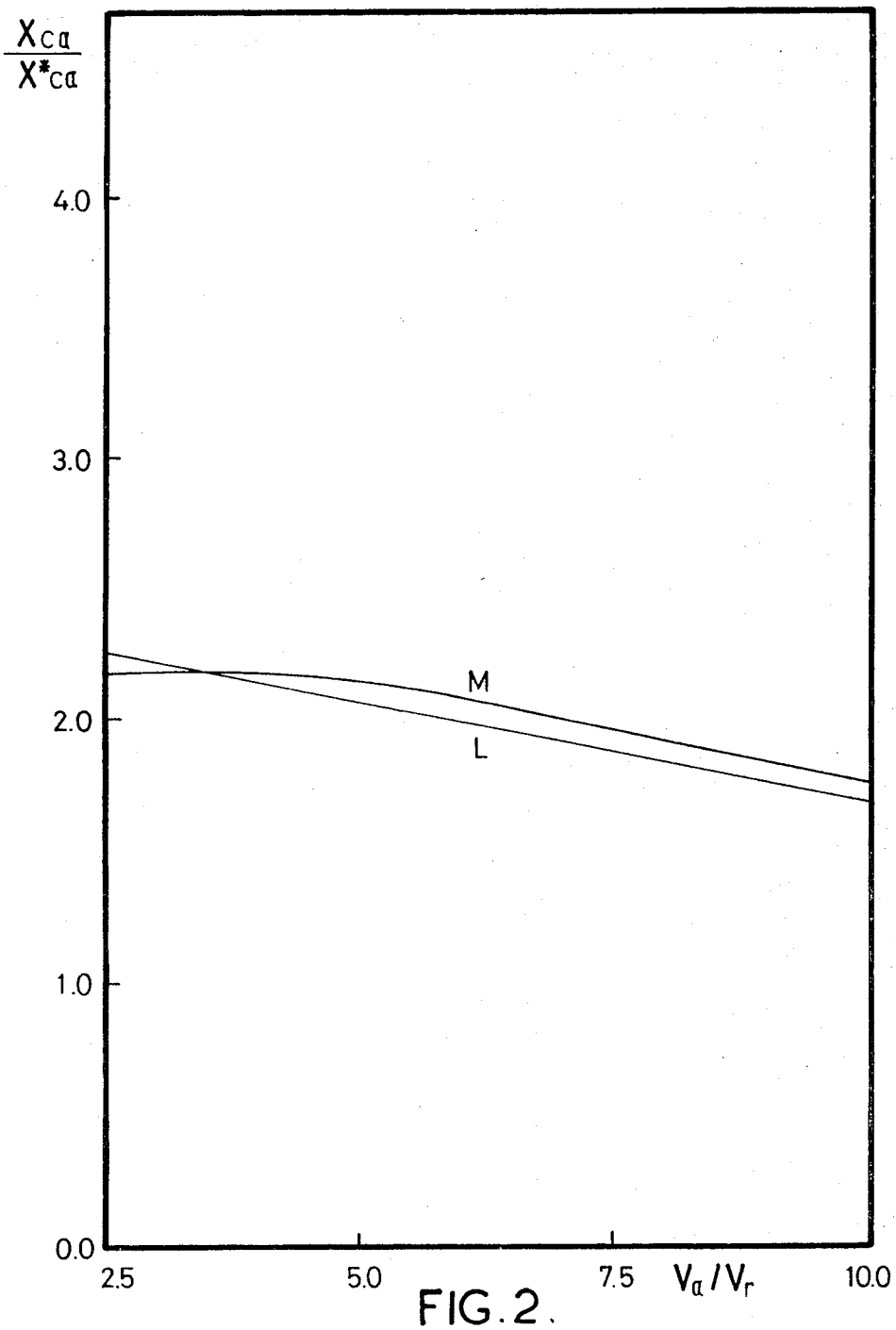

FIG. 2 illustrates how the calcium ion content is varied in the sea water subjected to a cationic exchange treatment in function of the volume of the treated water per volume of resin, as the parameter is the exhaustion flow rate and where:

$X_{Ca}$ is the $Ca^{++}$ ion concentration in the sea water;
$X_{Ca}^*$ is the $Ca^{++}$ ion concentration in the treated water;

in the case wherein:

M = exhaustion flow rate = $15V_a/V_r$ per h.;
N = exhaustion flow rate = $30V_a/V_r$ per h.;
$V_a/V_r$ = volumes of treated water per resin volume.

Figure 3:
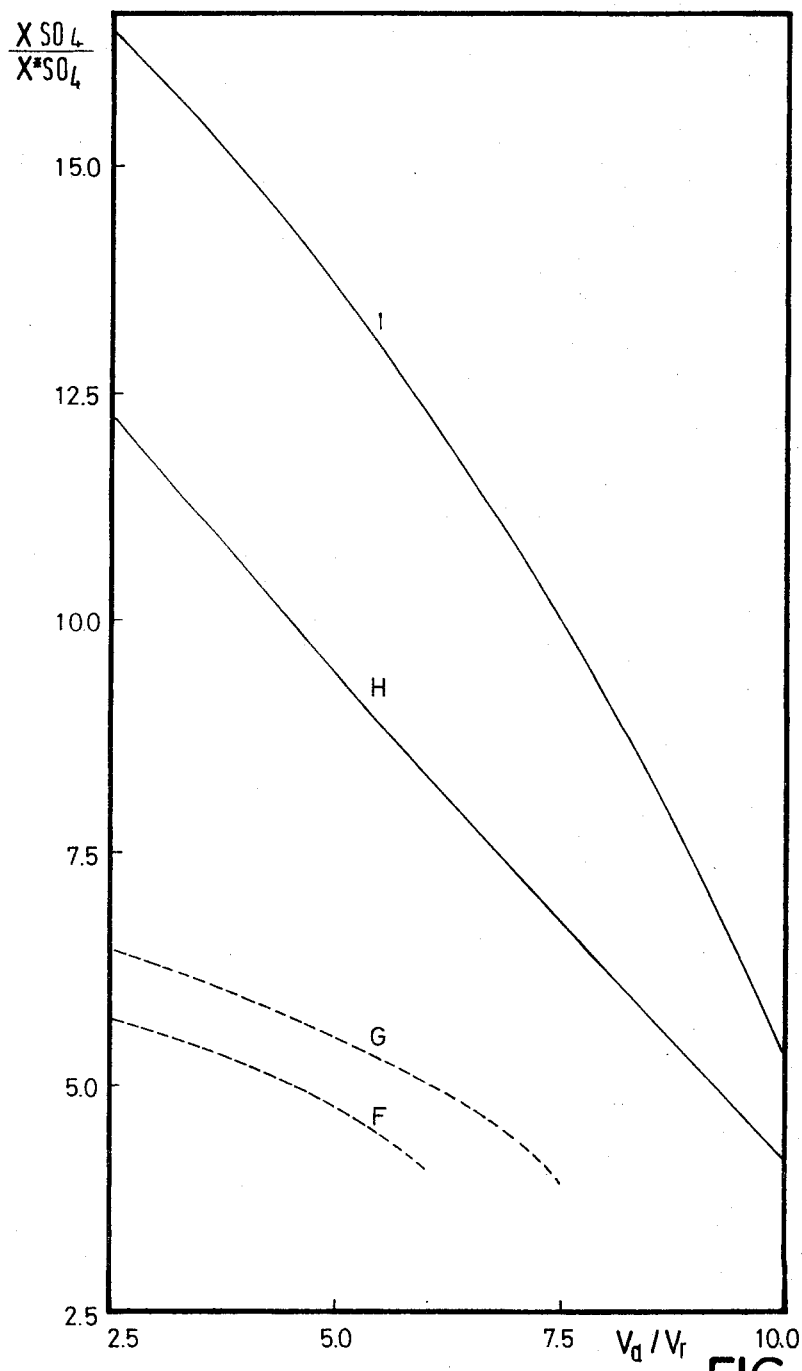

FIG. 3 illustrates the variation in the sulfate ion content in the sea water which has been subjected to an anionic exchange treatment in function of the volume of the treated water per resin volume, as the parameters are the pH of the effluent treated water and the exhaustion flow rate, and where:

$X_{SO_4}$ is the $SO_4^=$ ion concentration in the feed water;

$X_{SO_4}^*$ is the $SO_4^=$ ion concentration in the treated water.
Curve "F" relates to an exhaustion flow rate = $30V_a/V_r$ per h.;
with an average pH of $\leqslant 3.10$.
Composition of the regenerating brine:

$Cl^- = 75,000$ p.p.m. as NaCl
$SO_4^= = 1,400$ p.p.m. as $SO_4^=$
$[H^+] = 36$ s.p.m.

Curve "G" relates to an exhaustion flow rate of:

$15V_a/V_r$ per h. with an average pH $\leqslant 3.00$;
composition of the regenerating brine was as for the case of "F."

Curve "H" relates to an exhaustion flow rate of $30V_a/V_r$ with an average pH of $\leqslant 2.20$; composition of the regenerating brine:

$Cl^- = 75,000$ p.p.m. as NaCl
$SO_4^= = 1,400$ p.p.m. as $SO_4^=$
$[H^+] = 5$ e.p.m.

Curve "I" relates to an exhaustion flow rate of $15V_a/V_r$ per h.; with an average pH of $\leqslant 1.95$. Composition of the regenerating brine was as in the case of "H." $V_a/V_r$ = volumes of treated water per resin volume.

Figure 4:
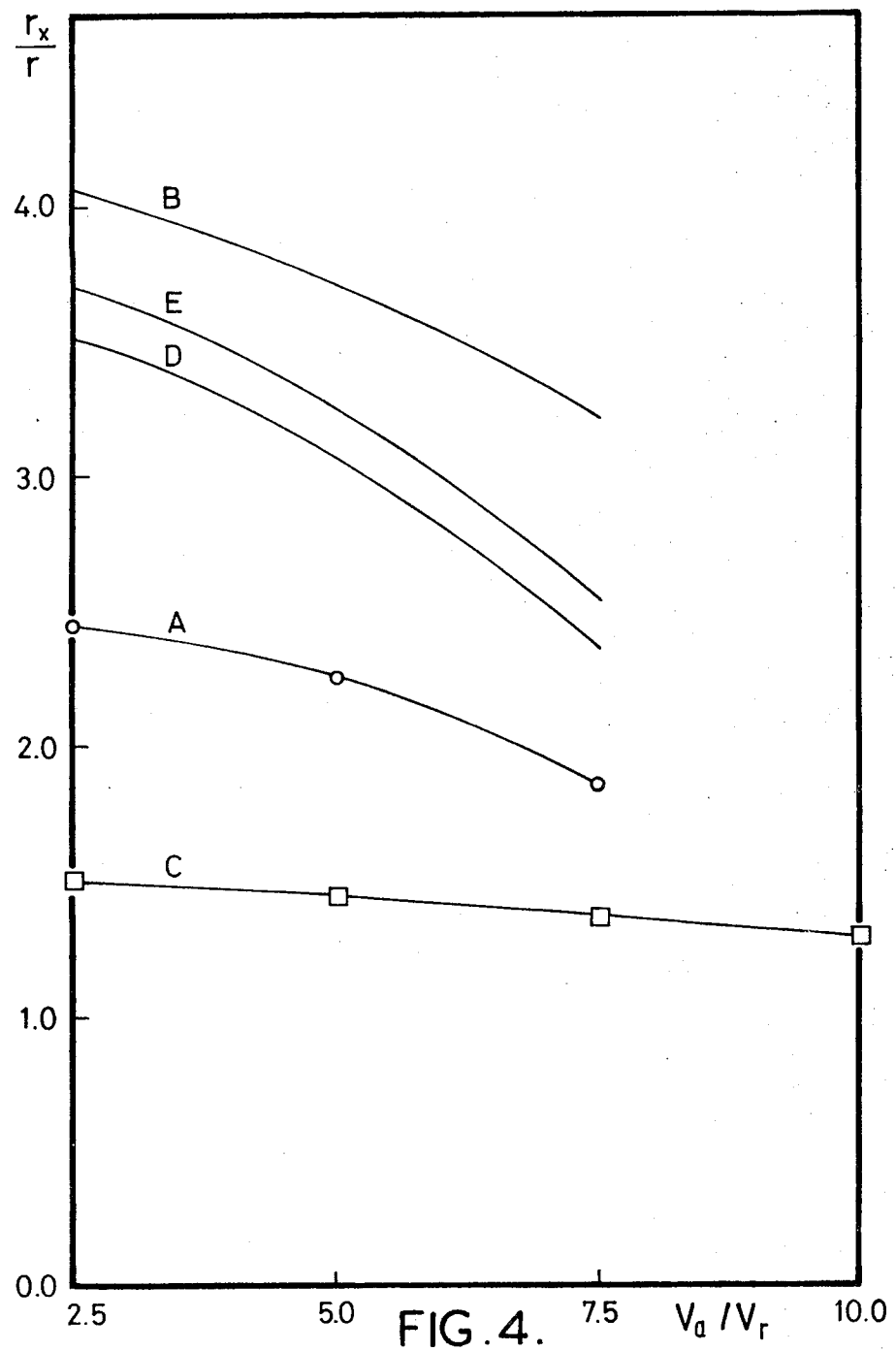

FIG. 4 illustrates the ratios between the concentration ratios $r_x$ which can be obtained when treated water is employed, and that of $r$ of the sea water as such, in function of the volume of treated water per resin volume, when the parameters of the average pH of the effluent water and the exhaustion flow rate, and more specifically, Curve "A" relates to an anionic exchange treatment, where:

The exhaustion and regeneration flow rate = $15V_a/V_r$ per h.; and the average pH of the treated water is 3.00 and the regenerating brine has $[H^+] = 5$ e.p.m.

Curve "B" relates to a nonionic exchange treatment where:

the exhaustion regeneration flow rate = $30V_a/V_r$ per h.;
the average pH = 1.75 and
the regeneration is performed by means of brine with $[H^+] = 36$ e.p.m.

Curve "C" relates to a cationic exchange treatment where: the exhaustion and regeneration flow rate is $30V_a/V_r$ per h.

Curve "D" relates to a mixed treatment comprising an anionic treatment where:

the exhaustion and regeneration flow rate is $15V_a/V_r$ per h. and the average pH is 3.00;
the regeneration is performed with brine with $[H^+] = 5$ e.p.m., and
a cationic exchange treatment, wherein the exhaustion and regeneration flow rate is that of: $15V_a/V_r$ per h.

Curve "E" relates to a mixed treatment comprising an anionic exchange treatment wherein:

the exhaustion and regeneration flow rate is $15V_a/V_r$ per h.;
the average pH = 3.00;
the regeneration brine contains $[H^+] = 5$ e.p.m., and
a cationic exchange treatment, where: the exhaustion and regeneration flow rate is $30V_a/V_r$ per h., and $V_a/V_r$ = volumes of treated water per resin volume.

Although the present invention has been adequately described in the foregoing specification, examples and drawings included therewith, it is readily apparent that one of ordinary skill in the art can change and modify the present invention without exceeding the scope and limitations thereof.

What is claimed is:

1. A method for removing sulfate and bicarbonate ions from sea water or brackish water prior to being subjected to desalination in a conventional desalination plant, which compises:
 permitting said sea water or brackish water to pass through a bed containing the chloride form of a weak anionic resin having amino functional groups of the primary and secondary type, said chloride form of said resin being expressed as R—Cl, thus permitting the sulfate ions in said sea water or brackish water to be exchanged for the chloride ions of said resin by the following equation:

$$R\text{—}Cl + SO_4^= \rightarrow R\text{—}SO_4 + Cl^- \quad (1)$$

said bicarbonate ions in said sea water or brackish water being eliminated by the hydrolysis of said resin according to the following equations:

$$R\text{—}Cl + H_2O \rightleftharpoons R\text{—}OH + \underline{H}^+ + Cl^- \quad (2)$$
$$HCO_3^- + \underline{H}^+ \rightarrow CO_2 + \overline{H}_2O \quad (3)$$

and subsequently, regenerating said resin to the chloride form, when said resin is exhausted, by permitting the brine solution discharged from the desalination procedure and having a salt concentration of at least 1.5 times greater than that of said sea water or brackish water to circulate through said bed containing said resin having said amino functional groups of the primary and secondary type, the chloride/sulfate ratio of said brine solution being at least 3 times greater than that of said sea water or brackish water treated, and the pH of said brine solution being between 4 and 5 to displace reaction (2) above, to the left.

2. A method for removing sulfate and bicarbonate ions from sea water or brackish water prior to being subjected to desalination in a conventional desalination plant, which comprises:

permitting said sea water or brackish water to pass through a bed containing the chloride form of a weak anionic resin of the DVB-acrylic type having amino functional groups of the primary and secondary type, said chloride form of said resin being expressed as R—Cl, thus permitting the sulfate ions in said sea water or brackish water to be exchanged for the chloride ions of said resin by the following equation:

$$R\text{—}Cl + SO_4^= \rightarrow R\text{—}SO_4 + Cl^- \quad (1)$$

said bicarbonate ions in said sea water or brackish water being eliminated by the hydrolysis of said resin according to the following equations:

$$R\text{—}Cl + H_2O \rightleftharpoons R\text{—}OH + \underline{H}^+ + Cl^- \quad (2)$$
$$HCO_3^- + \underline{H}^+ \rightarrow CO_2 + \overline{H}_2O \quad (3)$$

and subsequently, regenerating said resin to the chloride form, when said resin is exhausted, by permitting the brine solution discharged from the desalination procedure and having a salt concentration of at least 1.5 times greater than that of said sea water or brackish water to circulate through said bed containing said resin having said amino functional groups of the primary and secondary type, the chloride/sulfate ratio of said brine solution being at least 3 times greater than that of said sea water or brackish water treated, and the pH of said brine solution being between 4 and 5 to displace reaction (2) above, to the left.

3. The method of Claim 2, wherein, in the regeneration step, said reaction is driven to the left by the addition of a sufficient amount of a member selected from the group consisting of carbon dioxide and sulfur dioxide.

4. The method of Claim 2, wherein said weak anionic exchange resin is employed in combination with a strong cationic exchange resin.

5. The method of Claim 4, wherein said strong cationic resin is employed in an amount which is half of the amount employed for said anionic exchange resin.

References Cited

UNITED STATES PATENTS

| | | | |
|---|---|---|---|
| 2,559,529 | 7/1951 | Bauman | 210—37 |
| 3,156,644 | 11/1964 | Kunin | 210—32 |
| 3,458,439 | 7/1969 | Schmidt | 210—32 |
| 3,553,126 | 1/1971 | Oberhofer | 210—37 |
| 2,855,363 | 10/1958 | Kittredge | 210—30 |

SAMIH N. ZAHARNA, Primary Examiner

I. CINTINS, Assistant Examiner

U.S. Cl. X.R.

210—37